United States Patent [19]

Takamura

[11] 4,427,746
[45] Jan. 24, 1984

[54] TI-BASE MATERIAL FOR EYEGLASS-FRAMES AND A METHOD FOR PRODUCING SAME

[75] Inventor: Masayuki Takamura, Hamamatsu, Japan

[73] Assignee: Nippon Gakki Seizo Kabushiki Kaisha, Japan

[21] Appl. No.: 190,943

[22] Filed: Sep. 26, 1980

[30] Foreign Application Priority Data

Sep. 28, 1979 [JP] Japan .......................... 54-135422[U]
Oct. 1, 1979 [JP] Japan .......................... 54-136614[U]
Jun. 11, 1980 [JP] Japan ................................ 55-78820

[51] Int. Cl.³ ............................................ B32B 15/00
[52] U.S. Cl. .................................... 428/614; 428/660; 428/675
[58] Field of Search ............... 428/660, 661, 675, 680, 428/940, 614; 351/41; 72/47

[56] References Cited

U.S. PATENT DOCUMENTS

| | | | |
|---|---|---|---|
| 2,900,715 | 8/1959 | Milnes | 72/47 |
| 3,339,271 | 9/1967 | Durfee, et al. | 72/47 |
| 3,584,368 | 6/1971 | Sargent, Jr. | 72/47 |
| 3,813,258 | 5/1974 | Pieper, et al. | 428/675 |
| 3,854,194 | 12/1974 | Woodward | 428/675 |
| 3,905,828 | 9/1975 | Barber | 428/675 |
| 3,949,122 | 4/1976 | Leptit, et al. | 428/660 |

FOREIGN PATENT DOCUMENTS

| | | | |
|---|---|---|---|
| 51-34743 | 3/1976 | Japan | 351/41 |
| 55-94730 | 7/1980 | Japan | 428/675 |
| 55-99518 | 7/1980 | Japan . | |

OTHER PUBLICATIONS

Semialloy, *Brazing Alloys* Technical Bulletin BA, Semi Alloys Mt. Vernon, N.Y., 3 pages, (1968).

*Primary Examiner*—Michael L. Lewis
*Attorney, Agent, or Firm*—Ostrolenk, Faber, Gerb & Soffen

[57] ABSTRACT

In production of a Ti-base materal for eyeglass-frames of a core and sheath construction by cladding, a combination of Ti or Ti-base alloy for the core and Ni or Ni-base alloy for the sheath effectively prevents formation of fragile intermetallic compounds at the border, thereby greatly increasing the brazing strength of the product for advantageous use as eyeglass-frame parts.

7 Claims, 4 Drawing Figures

TI-BASE MATERIAL FOR EYEGLASS-FRAMES AND A METHOD FOR PRODUCING SAME

BACKGROUND OF THE INVENTION

The present invention relates to a Ti-base material for eyeglass-frames, and a method for producing same and more particularly relates to a Ti-base laminated, clad material advantageously usable for eyeglass-frame parts thanks to its high brazing strength, and a practical method for producing same.

Titanium has received much recognition as a material well suited for eyeglass-frame parts because of its high resistance against erosion, easy workability, excellent fitness to plating and relatively low specific gravity. Despite such excellent properties, use of the material in practice has been shelved long due to its relatively low brazing strength.

In order to cover this demerit, it has been proposed to produce a Ti-base material for eyeglass-frames by cladding a Cu alloy sheath, which has relatively high brazing strength, to a Ti core. After brazing is complete, the Cu alloy sheath is removed by, for example, etching in order to obtain a material for eyeglass-frame parts.

In accordance with this conventional proposal, however, very fragile intermetallic compounds are formed during heating for brazing at the border between the Ti core and the Cu alloy sheath. Usually, such compounds take the form of a Ti-Cu diffusion layer or phase. Presence of such intermetallic compounds naturally lowers the brazing strength of the resultant Ti-base material for eyeglass-frames.

SUMMARY OF THE INVENTION

It is one object of the present invention to provide a Ti-base material for eyeglass-frames which has high brazing strength and is well suited for plating.

It is another object of the present invention to provide a method for producing a Ti-base material for eyeglass-frames with high brazing strength whilst effectively preventing formation of fragile intermetallic compounds around the Ti or Ti-base alloy core.

In accordance with the present invention, a Ti-base linear material is made up of a Ti or Ti-base alloy core and a Ni or Ni-base alloy sheath cladded to the core. A Cu-base alloy outer sheath may further be inserted over and cladded to the Ni or Ni-base alloy inner sheath.

In accordance with the method of the present invention, a Ti or Ti-base alloy core and a Ni or Ni-base alloy sheath are assembled together in substantially concentric surface contact and the assembled material is subjected to hot treatment for cladding. A Cu-base alloy sheath may further be inserted over and cladded to the Ni or Ni-base alloy sheath.

DESCRIPTION OF THE PREFERRED EMBODIMENTS

Figure 1:
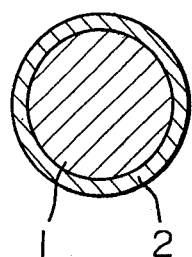
FIG. 1 is a cross sectional view of one embodiment of the Ti-base material for eyeglass-frames in accordance with the present invention.

One embodiment of the Ti-base material for eyeglass-frames in accordance with the present invention is shown in FIG. 1, in which the Ti-base material is provided with a substantially concentrically laminated cross-sectional construction. In the construction, a cylindrical sheath 2 made of Ni or a Ni-base alloy is inserted over and clad to a column-shaped core 1 made of Ti or a Ti-base alloy.

In case a Ti-base alloy is used for the core, the alloy should preferably contain 90% by weight or more of Ti. When the content of Ti in the alloy falls short of 90% by weight, the resultant alloy is poor in plastic workability. Further, increase in the amount of other ingredients results in corresponding increase in specific gravity of the alloy, thereby causing heavy construction of the obtained Ti-base material.

The ingredient to be contained in the alloy may include at least one of Al, Mn, Fe, Cu, Mo, Cr, V, W and C, and the total content of the ingredients should preferably be 10% by weight or less. Usually $H_2$ and $O_2$ gases are contained in Ti or the Ti-base alloy.

Clad ratio is given in the form of volume ratio. Assuming that the total volume of the resultant linear material is equal to 1, the preferable volume ratio for Ti or the Ti-base alloy should be in a range from 0.7 to 0.99. Any clad ratio falling short of 0.7 results in heavy construction. Whereas any clad ratio exceeding 0.99 causes lowering in cladding strength of the surface, and degrades the value of the product in actual use.

In case a Ni-base alloy is used for the sheath, the alloy should preferably contain 80% by weight or more of Ni. Ingredient to be contained in the alloy may include at least one of Cr, Cu, Fe, Ag, Si, S, Pb, Pt, Au, Sn, Co, a rare earth element, Mo, Al, Nb and Ti. The total content of the ingredients should preferably be 20% by weight or less.

The clad material is then subjected to annealing at a temperature in a range from 600° to 800° C. and cold wire drawing in order to be formed into a material for eyeglass-frames.

When pure Ti is used for the core and pure Ni is used for the sheath, annealing may be avoided. This combination is in particular suited for shaping into a complicated design.

In connection with the above-described process for production of a wire, it was confirmed that the resultant wire is still somewhat deficient in brazing strength of the surface, and that this deficiency in brazing strength is mostly caused by poor bonding strength between Ti and Ni. This deficiency is in particular remarkable when the wire is square in cross-sectional profile, since a square bar is liable to induce stress concentration upon clad layers. More specifically, hot treatment of the material such as hot extrusion for metal diffusion between Ti and Ni causes production of fragile inter-metal compounds such as $Ti_2Ni$, $TiNi$ and $TiNi_3$ which lower the bonding strength between Ti and Ni. In particular, the high temperature in the hot treatment tends to promote production of these intermetallic compounds.

Figure 2:
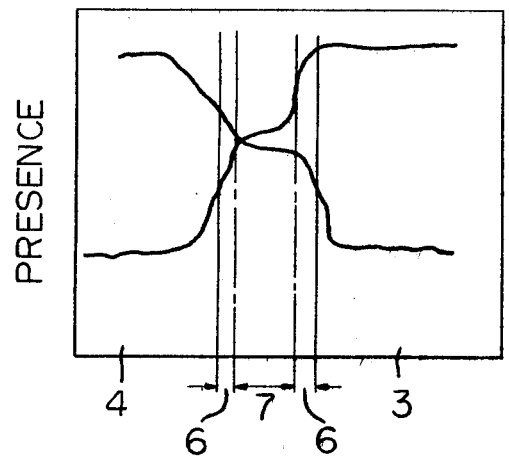
FIG. 2 is a graph for showing the result of X-ray micro-analysis applied to the bonded section of a conventional Ti-Ni type material for eyeglass-frames.

Production of such intermetallic compounds during the hot treatment was confirmed by X-ray micro-analyzation, whose result is shown in FIG. 2. In the drawing, a bonded section of clad materials is illustrated at about 5,000 magnifications. It is learned from the illustration that a Ti-Ni type intermetallic compound layer 7 is formed as a sort of easily destructible layer or phase at the border between a Ti layer 3 and a Ni layer 4 whilst being sandwiched between diffusion layers 6 made of Ti and Ni. It was also confirmed that no intermetallic compound is produced when the hot treatment is carried out at a temperature of 600° C. or lower. Further, it was noted that, in the case of shaping by extrusion, diffusion takes place between Ti and Ni even at a lower temperature, that such a low temperature assures sufficient bonding between Ti and Ni, and that brazing should also be performed at a low temperature.

In accordance with another embodiment of the present invention, a Ni or Ni-base alloy sheath is inserted over a Ti or Ti-base alloy core, the assembled material is subjected to hot extrusion for cladding at a temperature in a range from 200° to 600° C., and the clad material is subjected to further treatment such as annealing, cold wire drawing and rolling.

More specifically, a Ni or Ni-base alloy sheath and a Ti or Ti-base alloy core are prepared separately and the former is inserted over the latter. At this stage of the process, there is no bonding between the sheath and the core. That is, the core just covered with the sheath with surface contact. Next, the assembled material is subjected to hot extrusion at a temperature in a range from 200° to 600° C. The extrusion should preferably be carried out under a pressure in a range from 5,000 to 13,000 Kg/cm$^2$ on a hydrostatic extruder. Any temperature lower than 200° C. does not cause sufficient bonding by diffusion between Ti and Ni whereas any temperature above 600° C. tends to precipitation of fragile inter-metallic compounds, which greatly degrades the merit of the invention. By this extrusion, the diameter of the material is reduced to one-second to one-fifth of its original value and the sheath and core are firmly clad together.

The clad material so obtained is then subjected, when required, to annealing for removal of strain developed during the extrusion and for easy practice of subsequent cold treatment. This annealing should preferably be carried out at a temperature in a range from 300° to 600° C. When the temperature falls short of 300° C., no sufficient annealing effect can be obtained. Any temperature above 600° C. is liable to promote precipitation of fragile Ti-Ni intermetallic compounds. More specifically, the clad material is heated for 2 hours at 450° C., or 30 min. at 550° C., or 10 min. or shorter at 600° C.

When required, the clad linear material is further subjected to cold wire drawing or rolling in order to shape into, for example, eyeglass-frame parts such as temples, hinges, rims, bridges and ringsters. In order to form a complete eyeglass-frame, the linear materials are combined with similar or different linear materials by brazing at a temperature of 600° C. or lower. At such a temperature, the brazing should be carried out within 30 min. in order to prevent precipitation of Ti-Ni intermetallic compounds. To this end, materials of melting points lower than 600° C., for example Cd-Ag-Zn-Cu alloy, is used for brazing.

Figure 3:
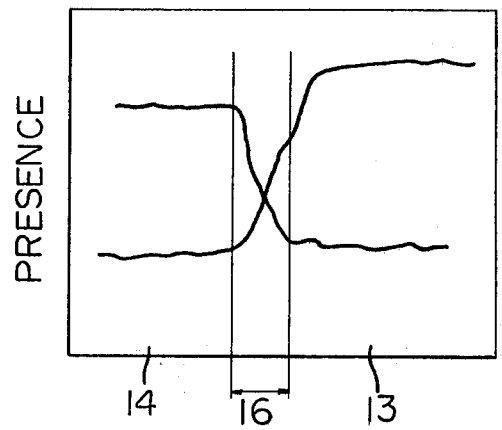
FIG. 3 is a graph for showing the result of X-ray micro-analysis applied to the bonded section of a Ti-base material in accordance with the present invention.

In accordance with the above-described embodiment of the present invention, the treatments applied to the assembled material are carried out at relatively low temperatures in order to prevent precipitation of fragile Ti-Ni intermetallic compounds for stronger bonding between Ti and Ni. The bonded section of the clad material produced in accordance with the above-described embodiment of the present invention is shown in FIG. 3 at about 5,000 magnifications. It is clearly seen in the drawing that a diffusion layer 16 is formed at the border between a Ti layer 13 and Ni layer 14 but there exists no easily destructible Ti-Ni type intermetallic compound layer which is found in the conventional construction shown in FIG. 2. Further, thanks to the fortified bonding between Ti and Ni, no precipitation occurs between the Ti and Ni layers even when the clad material has a polygonal cross-sectional profile other than the circular and/or the clad material includes a very thin layer. This outcome is in particular suited for use as eyeglass-frames of light weight. In other words, the light weight of Ti material is well maintained whilst reserving the strength resulted from use of Ni or Ni-base alloy material.

In accordance with the other embodiment of the present invention, an inner sheath of Ni or Ni-base alloy is interposed between a core of Ti or Ti-base alloy core and an outer sheath of Cu alloy. Presence of the intermediate, inner sheath effectively hinders production of fragile intermetallic compounds between Ti and Ni, thereby greatly raising the brazing strength of the resultant linear material.

Figure 4:
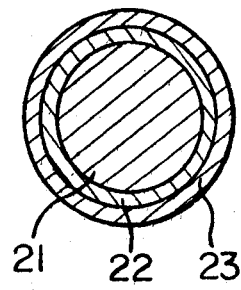
FIG. 4 is a cross sectional view of another embodiment of the Ti-base material in accordance with the present invention.

More specifically in FIG. 4, a linear material includes a column shaped Ti or Ti-base alloy core 21, a cylindrical Ni or Ni-base alloy inner sheath 22 embracing the core 21, and a cylindrical Cu alloy outer sheath 23 wholly covering the inner sheath 22.

In production, the Ni or Ni-base alloy inner sheath 22 is inserted over and clad to the Ti or Ti-base alloy core 21 in order to form an intermediate clad material. Next, the Cu alloy outer sheath 23 is inserted over and clad to the intermediate clad material in order to form a complete clad material. As an alternate, the three elements 21, 22 and 23 may be assembled together and subjected to simultaneous cladding.

In the case of this embodiment, hot treatments should preferably be carried out a temperatures not exceeding 600° C.

EXAMPLE

The following examples are illustrative of the present invention but not to be construed as limiting the same.

EXAMPLE 1

Linear materials for eyeglass-frame parts were produced in accordance with the first embodiment of the present invention. For each material, a Ti circular rod of 50 mm. diameter and 1,000 mm. length was used for the core, and a Ni cylinder of 50.5 mm. outer diameter, 50 mm. inner diameter and 1,000 mm. length was used for the sheath. The Ni sheath was inserted over the Ti core and both were subjected to cladding at about 700° C. on a hot hydrostatic extruder in order to form a clad material of 10 mm. diameter. Next, the clad material was subjected to annealing at 600° to 700° C. temperature for softening and formed into a linear material of 5 mm. diameter by cold wire drawing. The linear material was again annealed at 600° to 700° C. temperature and subsequently subjected to cold wire drawing in order to form an ultimate linear material of 2.6 mm. diameter. The clad ratio was 0.98 for the Ti core and 0.02 for the Ni sheath.

Eyeglass-frames made of the linear materials so produced were subjected to measurement of brazing strength, bending strength and resistance against erosion by sweat. The result of the measurement is shown in Table 1.

For measurement of the brazing strength, an eyeglass-frame was produced from a linear material of each sample and tear strength between the bridge and the ringster was measured.

produced in accordance with the first embodiment of the present invention are best suited for use for eyeglass-frame parts.

EXAMPLE 2

Linear materials for eyeglass-frame parts were pro-

TABLE 1

| Sample No. | Core | Sheath | Clad ratio | Weight in g. | Brazing strength in Kg/km$^2$ | Bending strength in Kg. | Resistance* against erosion by sweat | Category** |
|---|---|---|---|---|---|---|---|---|
| 1 | Ti | — | — | 11.4 | 0.5 | 0.41 | O | |
| 2 | Ti | nickel silver | 0.8:0.2 | 13.6 | 2.8 | 0.85 | X | PI |
| 3 | Ti | Ni—10Cr—2Cu | | 13.5 | 10.1 | 0.83 | O | PI |
| 4 | Ti | Ni—20Cr—3Cu | | 13.5 | 10.2 | 0.86 | O | PI |
| 5 | Ti | Ni—15Cr—Cu—Ag | | 13.4 | 9.8 | 0.86 | O | PI |
| 6 | Ti | Ni— | 0.7:0.3 | 14.5 | 10.0 | 0.80 | O | PI |
| 7 | Ti | 10Cr—2Cu | 0.98:0.02 | 11.6 | 10.5 | 0.87 | O | PI |
| 8 | Ti—6Al—4A | 2Cu | 0.8:0.2 | 13.3 | 10.2 | 0.84 | O | PI |
| 9 | Ni—10Cr—2Cu | — | — | 21.6 | 10.8 | 0.88 | O | |
| 10 | Ti | Ni | 0.8:0.2 | 13.5 | 10.4 | 0.83 | O | PI |
| 11 | nickel silver | — | — | 22.1 | 11.4 | 0.87 | X | |

*O No colour change
X Full colour change
**PI Present invention

For measurement of the bending strength, one end of a temple of the eyeglass-frame (0.9 mm. in thickness and 3.5 mm. in width) was fixed at the one end and loaded at the other end which was 45 mm. distant from the one end. The value of a load causing 1 mm. of permanent deformation was recorded.

For measurement of the resistance against erosion by sweat, each sample was dipped in a bath of artificial sweat having the following composition for 5 days.

| | |
|---|---|
| Sodium chloride | 9.8 g/l |
| Urea | 1.7 g/l |
| Glucose | 0.2 g/l |
| Lactic acid | 0.8 cc |
| Sodium sulfide | 0.8 g/l |
| Ammonia | 0.02 g/l |
| Water | remnant |

As is well understood from the result given in the table, the Ti-base linear materials produced in accordance with the first embodiment of the present invention were provided with high brazing and bending strengths and resistance against erosion by sweat, despite their light constructions. The bending strength of these Ti-base linear materials corresponded to those of conventional linear materials made of nickel silver and Ni-base alloys. It can be said that the linear materials duced in accordance with the second embodiment of the present invention. For each material, a core made of a Ti circular rod of 50 mm. diameter was inserted into a sheath of a Ni cylinder of 1 mm. wall thickness in order to obtain an assembled material of 1,000 m. length and 0.92 clad ratio. The assembled material was subjected to hot hydrostatic extrusion at 450° C. temperature and 9,000 kg/cm$^2$ pressure in order to obtain a clad material of 15 mm. diameter.

The clad material was then subjected to annealing at 450° C. for 120 min. for softening, and cold wire drawing in order to obtain an intermediate linear material of 9 mm. diameter. This intermediate linear material was again subjected to annealing at 450° C. for 120 min., and cold wire drawing in order to obtain a linear material of 2.6 mm. diameter.

This linear material was further subjected to cold wire drawing in order to obtain a linear material of a square cross section (0.9 mm.×3.0 mm.) which was then subjected to brazing using a brazing material containing 15% by weight of Cd, 50% by weight of Ag, 15% by weight of Zn and 20% by weight of Cu in order to obtain an eyeglass-frame.

Various eyeglass-frames made in the above-described manner were subjected to measurement of brazing and bending strengths, and the result is shown in Table 2.

TABLE 2

| Sample No. | 12 | 13 | 14 | 15 | 16 | 17 | 18 | 19 | 20 | 21 | 22 |
|---|---|---|---|---|---|---|---|---|---|---|---|
| Core | Ti | Ti | Ti | Ti | Ti | Ti | Ti | Ti—6Al—4V | Ti—6Al—4V | Ti | Ni—10Cr—2Cu |
| Sheath | Ni | Ni | Ni | Ni | Ni | Ni | Ni—10Cr—2Cu | Ni—10Cr—2Cu | Ni | — | — |

TABLE 2-continued

| Sample No. | 12 | 13 | 14 | 15 | 16 | 17 | 18 | 19 | 20 | 21 | 22 |
|---|---|---|---|---|---|---|---|---|---|---|---|
| Clad ratio | | | | | | 0.92 | | | | — | — |
| Hydrostatic extrusion temperature in °C. | 450 | 450 | 450 | 700 | 580 | 750 | 450 | 450 | 450 | — | — |
| Annealing temperature in °C. | 450 | 450 | 700 | 450 | 580 | 700 | 450 | 450 | 450 | 450 | 450 |
| Brazing temperature in °C. | 450 | 700 | 450 | 450 | 580 | 700 | 450 | 450 | 450 | 450 | 450 |
| Weight in g. | 13.2 | 13.2 | 13.2 | 13.2 | 13.2 | 13.2 | 13.2 | 13.3 | 13.3 | 11.4 | 21.8 |
| Brazing strength in kg/mm$^2$ | 11.3 | 10.4 | 10.1 | 9.9 | 11.3 | 9.5 | 11.5 | 11.4 | 11.3 | 0.6 | 11.1 |
| Bending strength in kg | 0.78 | 0.77 | 0.78 | 0.79 | 0.77 | 0.79 | 0.80 | 0.88 | 0.87 | 0.42 | 0.89 |
| Category | PI | | (*) | | PI | | PI | PI | PI | | |

(*) Although this sample nominally belongs to the present invention inappropriate annealing temperature caused ill result in strength.

The result given in the table clearly indicates rise in brazing strength resulted from the present invention.

EXAMPLE 3

A linear material for eyeglass-frame parts was produced in accordance with the third embodiment of the present invention.

A Ti circular rod of 50 mm. diameter and 1,000 mm. length was used for the core, a Ni cylinder of 50.5 mm outer diameter, 50 mm. inner diameter and 1,000 mm. length was used for the inner sheath, and a nickel silver cylinder of 55 mm. outer diameter, 50.5 inner diameter and 1,000 mm. length was used for the outer sheath. The three components were assembled together by mutual insertion and the assembled material was subjected to hot hydrostatic extrusion at 700° C. in order to obtain a clad material of 10 mm. diameter. The clad material was then subjected to repeated combination of annealing with cold wire drawing in order to obtain a Ti-base linear material of 2.6 mm. diameter.

A temple and a hinge for an eyeglass-frame were formed from the above-described linear material and brazed together for measurement of brazing strength. Ag and BAg 4 were used for the brazing. The result of the measurement is shown in Table 3.

TABLE 3

| SAMPLE NO. | 23 | 24 | 25 |
|---|---|---|---|
| Material | Nickel Silver | Ti—Nickel Silver | Ti—Ni—Nickel Silver |
| Weight in g. | 22.5 | 13.8 | 13.9 |
| Brazing in kg/mm$^2$. | 10.5 | 2.1 | 9.8 |

The result given in the table warrants the fact that the Ti-base linear material of the present invention (sample No. 25) is by far superior in brazing strength to the conventional Ti-nickel silver type linear material (sample No. 24), and that its brazing strength is very close to that of the nickel silver linear material (sample No. 23). In addition, the Ti-base linear material of the present invention is remarkably lighter in construction than the nickel silver linear material. Thus, the Ti-base linear material of the present invention is well suited for use for eyeglass-frame parts.

This advantage is caused by the fact that no fragile inter-metal compound exists, due to presence of the Ni inner sheath, between the Ti core and the Cu outer sheath, and that, further, no fragile intermetallic compound is formed at the border between the Ti core and the Ni inner sheath.

I claim:

1. A Ti-base material for eyeglass-frames comprising a Ti or Ti-base alloy containing 90% by weight or more of Ti core, and a sheath of Ni or an alloy consisting essentially of at least 80% by weight of Ni and at least one of Cr, Cu, Fe, Ag, Si, S, Pb, Pt, Au, Sn, Co, rare earth elements, Mo, Al, Nb and Ti, said sheath in substantially concentric surface directly cladded to said core, the clad ratio of said core to said sheath in the range of 0.7 to 0.99.

2. A ti-base material as claimed in claim 1 further comprising
    a Cu or Cu-base alloy sheath cladded to said Ni or Ni-base alloy sheath.

3. A Ti-base material as claimed in claim 1 in which said Ti-base alloy for said core contains at least one of Al, Mn, Fe, Cu, Mo, Cr, V, W and C.

4. A Ti-base material as claimed in claim 1 in which the Ti or Ti-base alloy core is Ti.

5. A Ti-base material as claimed in claim 4 in which the Ni or Ni-base alloy sheath is Ni.

6. A Ti-base material as claimed in claim 4 in which the Ni or Ni-base alloy sheath is a Ni-base alloy.

7. A Ti-base material as claimed in claim 6 in which the Ti or Ti-base alloy core is Ti.

* * * * *